US006553293B1

(12) United States Patent
Hac

(10) Patent No.: US 6,553,293 B1
(45) Date of Patent: Apr. 22, 2003

(54) REAR STEERING CONTROL FOR VEHICLES WITH FRONT AND REAR STEERING

(75) Inventor: Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/042,377

(22) Filed: Jan. 3, 2002

(51) Int. Cl.[7] .................................................. B62D 6/04
(52) U.S. Cl. ............................ 701/42; 701/41; 701/70; 701/72; 701/78; 701/91; 180/197; 180/412; 180/252; 180/253; 180/280; 180/282; 180/233
(58) Field of Search ............................ 701/42, 41, 70, 701/72, 78, 89, 90, 44, 91; 180/197, 412, 446, 443, 141, 791, 252, 253, 280, 282, 233, 248, 408, 415

(56) References Cited

U.S. PATENT DOCUMENTS

| 4,842,089 | A | | 6/1989 | Kimbrough et al. ........ 180/140 |
|---|---|---|---|---|
| 5,402,341 | A | | 3/1995 | Liubakka et al. ........... 180/140 |
| 5,448,481 | A | * | 9/1995 | Asanuma et al. ........... 180/140 |
| 5,457,632 | A | * | 10/1995 | Tagawa et al. ............. 180/141 |
| 5,515,275 | A | | 5/1996 | Ackerman .................. 180/197 |
| 5,576,957 | A | * | 11/1996 | Asanuma et al. ........... 180/197 |
| 5,615,117 | A | * | 3/1997 | Mitsuya ........................ 701/42 |
| 5,627,754 | A | | 5/1997 | Asanuma et al. ........... 180/408 |
| 5,734,570 | A | | 3/1998 | Arlandis ....................... 701/42 |
| 6,161,905 | A | | 12/2000 | Hac et al. .................... 303/146 |
| 6,169,951 | B1 | * | 1/2001 | Ghoneim et al. ............. 701/70 |
| 6,205,391 | B1 | | 3/2001 | Ghoneim et al. ............. 701/70 |
| 2002/0029102 | A1 | * | 3/2002 | Badenoch .................... 701/41 |
| 2002/0042671 | A1 | * | 4/2002 | Chen et al. ................... 701/41 |

FOREIGN PATENT DOCUMENTS

| JP | 402189276 | * | 7/1990 |
|---|---|---|---|
| JP | 403010972 | * | 1/1991 |
| JP | 403248967 | * | 11/1991 |

* cited by examiner

*Primary Examiner*—Thomas C. Black
*Assistant Examiner*—Tuan To
(74) *Attorney, Agent, or Firm*—Scott A. McBain

(57) ABSTRACT

The invention provides a method and computer usable medium, including a program, for steering a vehicle having driver-controlled front wheel steering and active rear wheel steering. A rear wheel steering angle static portion is determined based on a control gain and a front wheel steering angle. A slew-limited magnitude of desired lateral acceleration is determined based on a desired lateral acceleration. A multiplying factor is determined based on the slew-limited magnitude of desired lateral acceleration. A feed-forward rear steering angle is determined based on the multiplying factor, the rear wheel steering angle static portion, and a rear wheel steering angle dynamic portion.

18 Claims, 6 Drawing Sheets

Feed-Forward Control with Static and Dynamic Gains.
Steering inputs and vehicle responses in a lane change maneuver performed at 30 m/s with amplitude of front steering angle of 0.05 radians.

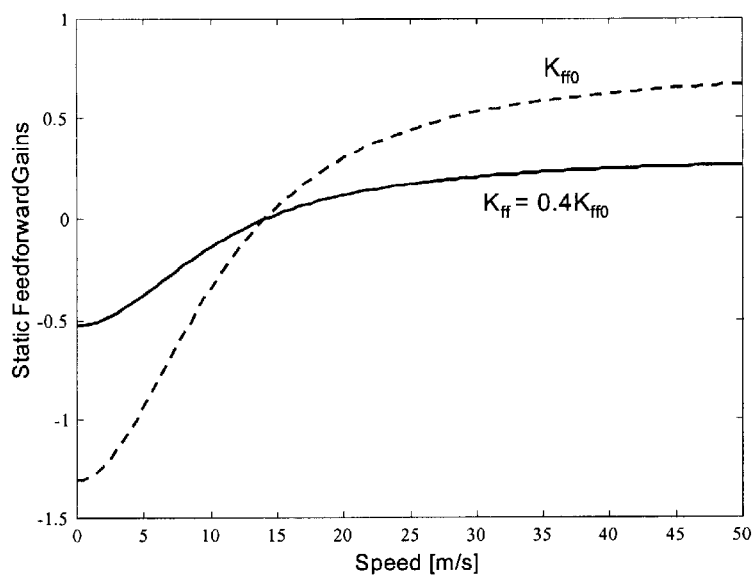
FIG. 1. *Static Feed-Forward Gain as a Function of Vehicle Speed.*
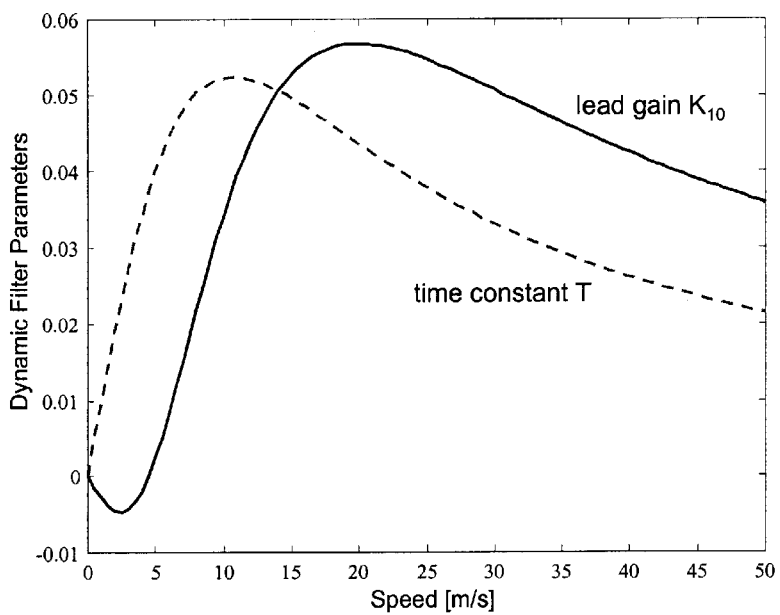
FIG. 2. *Parameters of Dynamic Feed-Forward Gain as a Function of Vehicle Speed.*

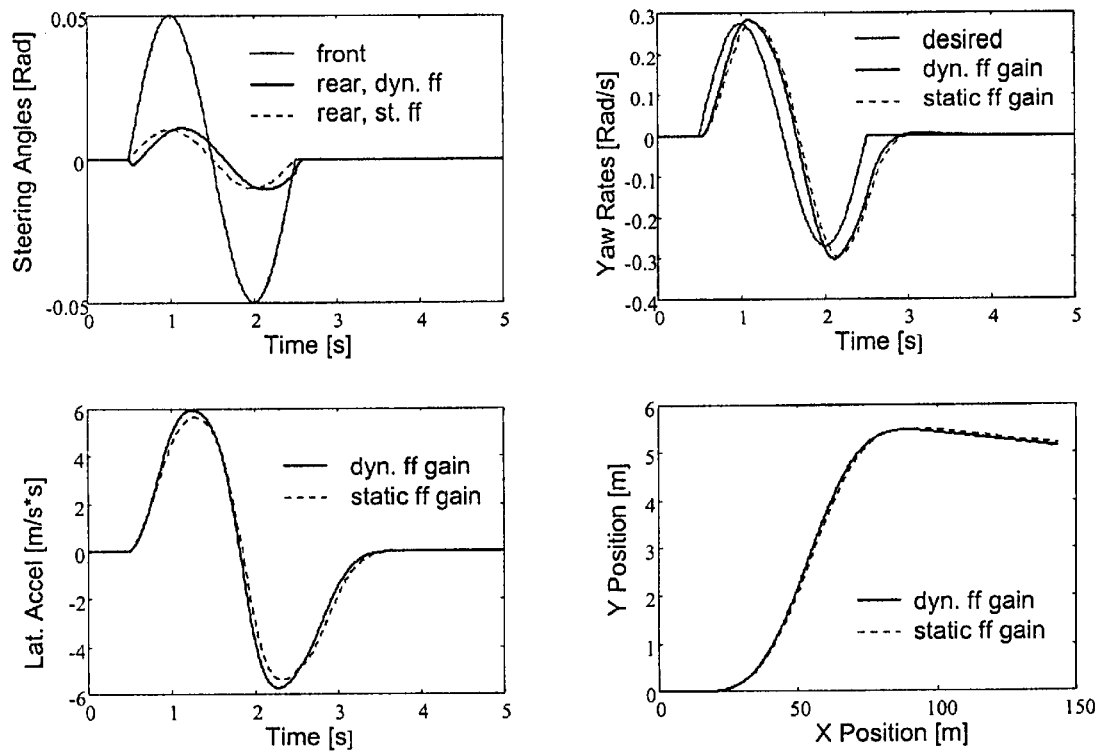
FIG. 3. *Feed-Forward Control with Static and Dynamic Gains.* Steering inputs and vehicle responses in a lane change maneuver performed at 30 m/s with amplitude of front steering angle of 0.05 radians.

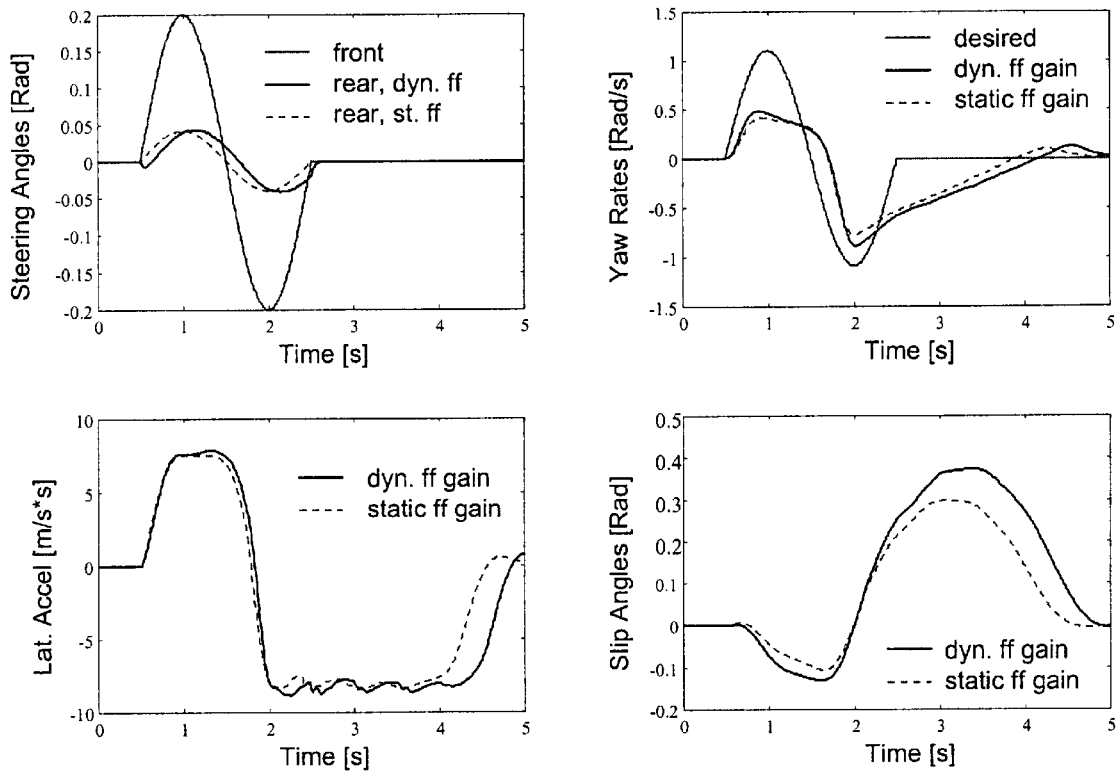
FIG. 4. *Feed-Forward Control with Static and Dynamic Gains. Steering input and vehicle responses in a lane change maneuver performed at 30 m/s with amplitude of front steering angle 0.2 radians.*

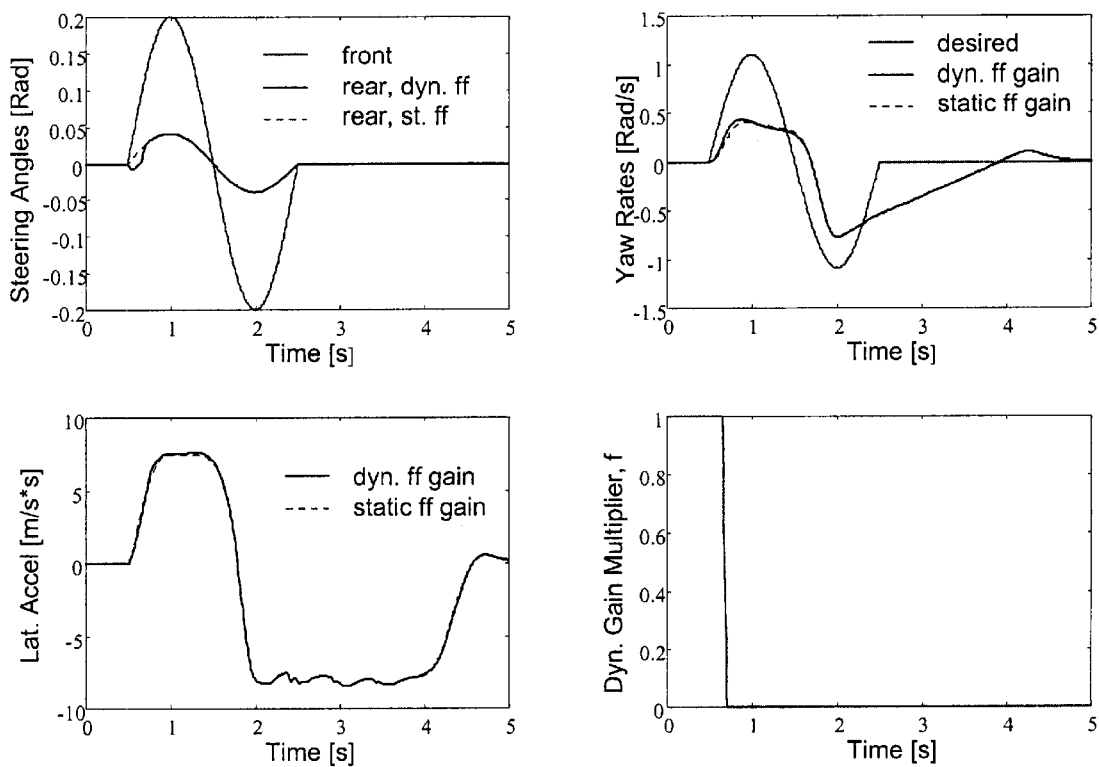
FIG. 5. *Adaptable Gains in Dynamic Feed-Forward Control.*
Lane change maneuver at 30 m/s with front steering angle amplitude of 0.2 radians.

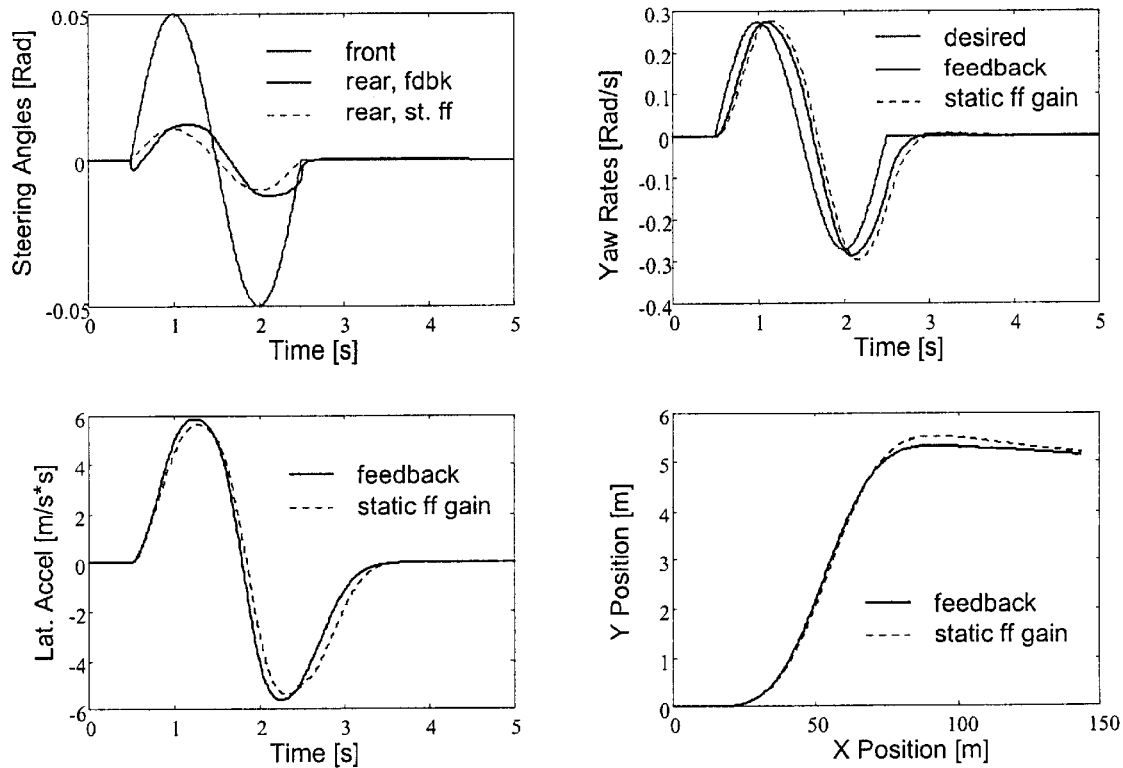
FIG. 6. *Feed-Forward Control with Static Gain and Feedback Control.* Lane change maneuver at 30 m/s with front wheel steering angle amplitude of 0.05 radians.

REAR STEERING CONTROL FOR VEHICLES WITH FRONT AND REAR STEERING

TECHNICAL FIELD OF THE INVENTION

The present invention relates generally to vehicular rear-wheel steering control. More particularly, the invention relates to enhanced transient response for vehicles with active rear steering.

BACKGROUND OF THE INVENTION

For vehicles having four-wheel steering systems, active rear steering may improve maneuverability. For example, active rear steering may reduce the turning radius and enhance vehicle handling by improving both quickness of response and stability. At present, vehicle steering control algorithms may include a feed-forward static gain and a feedback yaw control. The feed-forward gain is selected to reduce turning radius at low speeds and to increase vehicle stability at high speeds. The feedback yaw control is primarily designed to improve system robustness and vehicle stability at or close to the limit of adhesion.

In active rear steering, the vehicle rear wheels may be steered at an angle proportional to that of front wheels. The gain relating the rear and front steering angles is a function of speed, being negative at low speeds and positive at high speeds. At low speeds, the rear wheels are steered in the direction opposite to the front wheels thereby improving maneuverability (i.e., tightening the radius of vehicle path). At high speeds, the rear wheels are steered in the same direction as the front wheels to promote stability. In order to further enhance vehicle handling and stability, a closed loop yaw control algorithm may be added to the existing feed-forward control. The closed loop yaw control algorithm may be derived from a brake based stability enhancement algorithm.

To provide desirable handling characteristics, phase lags in yaw rate phase lags and lateral acceleration responses to steering angle should be short and remain relatively consistent with one another throughout the range of speeds. Quick response to steering input may prevent the driver from oversteering. In addition, consistent transient behavior may allow the driver to more properly anticipate vehicle response.

The feed-forward static gain and closed loop yaw control algorithm may have limitations in improving vehicle handling within the linear range. For example, when the rear wheels are steered in proportion to the front wheels (e.g., a static feed-forward gain), the lag in yaw rate transient response may not be significantly reduced as compared to a front steer vehicle. Furthermore, the closed loop yaw control algorithm may not generate a significant correction for when vehicle is in the linear range of handling, even if control "dead-band" is removed.

One way to overcome the problem is to use the desired yaw rate derived from a static relationship between yaw rate, steering angle and speed, rather than using a yaw rate estimated from vehicle dynamics. In this way, the desired yaw rate may precede the actual yaw rate during quick transient maneuvers. As such, a closed loop steering correction may be produced thereby reducing vehicle response lag. This advantage may be provided if additional accurate sensors permitting closed loop control (such as yaw rate sensor and lateral acceleration sensor) are available. The cost of sensors, especially the yaw rate sensor may increase the overall cost of the system. Accordingly, it would be desirable to overcome the problem without the need for additional sensors.

Therefore, it would be desirable to provide a method for transient response enhancement for vehicles with active rear steering that overcomes the aforementioned and other disadvantages.

SUMMARY OF THE INVENTION

One aspect of the present invention provides a method for steering a vehicle having driver-controlled front wheel steering and active rear wheel steering. A rear wheel steering angle static portion is determined based on a control gain and a front wheel steering angle. A slew-limited magnitude of desired lateral acceleration is determined based on a desired lateral acceleration. A multiplying factor is determined based on the slew-limited magnitude of desired lateral acceleration. A feed-forward rear steering angle is determined based on the multiplying factor, the rear wheel steering angle static portion, and a rear wheel steering angle dynamic portion. The active rear wheel steering may be controlled electronically. The multiplying factor may equal one when the slew-limited magnitude of desired lateral acceleration is less than an assigned value of about 8 m/s$^2$. The multiplying factor may equal zero when the slew-limited magnitude of desired lateral acceleration is greater than an assigned value of about 12 m/s$^2$. The multiplying factor may be determined based on a magnitude of yaw rate error and/or a linear interpolation. The feed-forward rear steering angle may be determined in accordance with a Laplace domain expression and/or based on at least one value table. The rear wheel static feed-forward gain, $K_{ff}$, the lead gain, $K_1$, and the time constant, T, may be functions of vehicle speed Another aspect of the invention provides a computer usable medium, including a program, for steering a vehicle having driver-controlled front wheel steering and active rear wheel steering. The invention provides computer readable program code for performing the method steps described above.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 1 is a representative graph of static feed-forward gain as a function of vehicle speed;

FIG. 2 is a representative graph of parameters of dynamic feed-forward gain as a function of vehicle speed;

FIG. 3 are representative graphs of feed-forward control with static and dynamic gains;

FIG. 4 are representative graphs of feed-forward control with static and dynamic gains;

FIG. 5 are representative graphs of adaptable gains in dynamic feed-forward control;

FIG. 6 are representative graphs of feed-forward control with static gain and feedback control.

DETAILED DESCRIPTION OF THE PRESENTLY PREFERRED EMBODIMENTS

Analysis Based on a Linear Model

Figure 7:
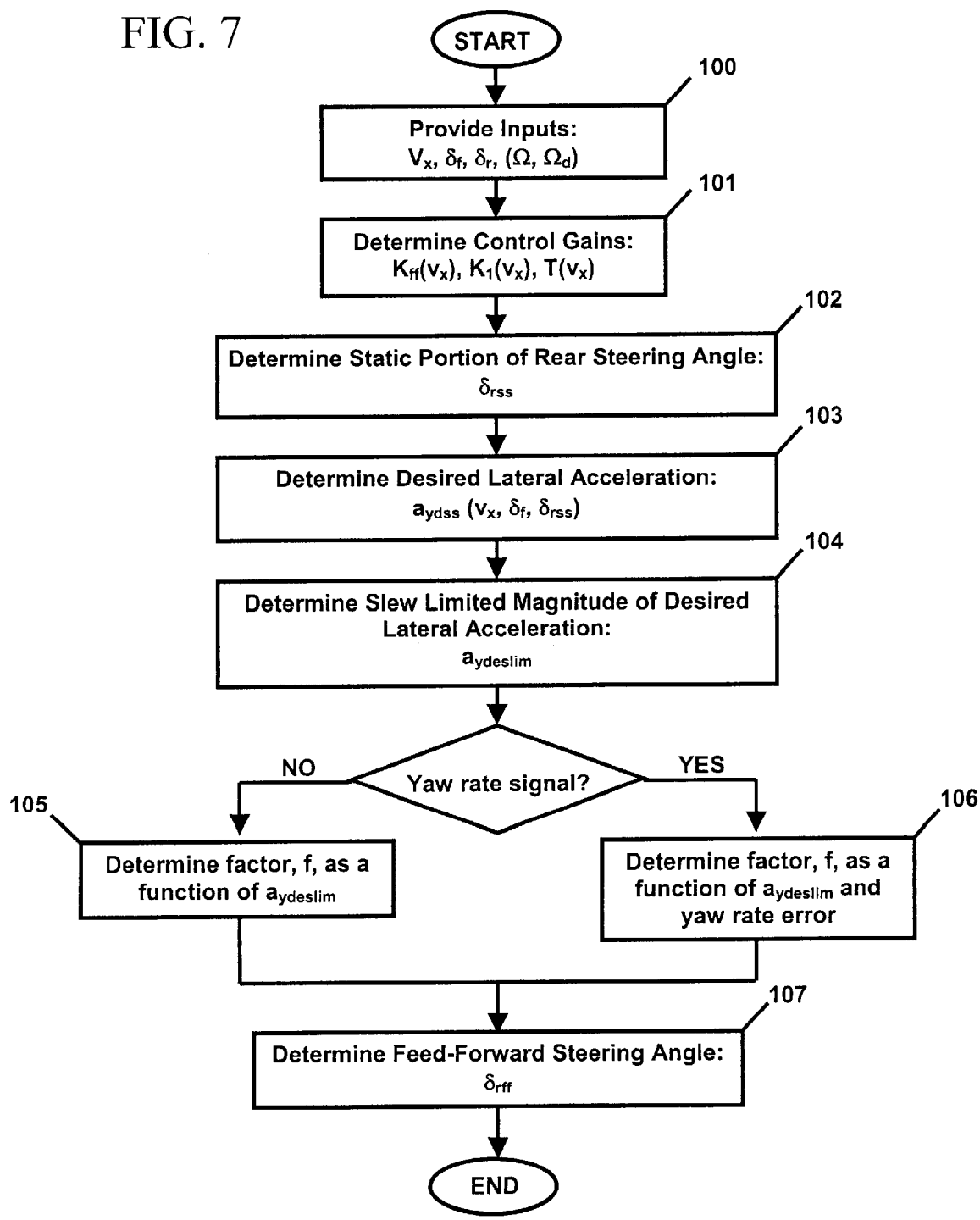
FIG. 7 is a flow chart of a dynamic feed-forward control algorithm made in accordance with the present invention.

To design a control algorithm for vehicles with four-wheel steering, the principles governing the control strategy should be considered. In this section, the fundamental dynamic properties of vehicles with four-wheel steer are examined. This provides insights regarding the advantages and limitations of feed-forward rear steering control with a static gain.

The steering response of a motor vehicle may be conveniently represented by a bicycle model, which represents the translatory lateral motion and rotary motion of vehicle in the yaw plane. Assuming tire lateral forces are linear functions of side slip angles, the dynamics of vehicle with front and rear steer in the yaw plane may be described by the following state equations:

$$\dot{v}_y = a_{11}(v_x)v_y + a_{12}(v_x)\Omega + b_{11}\delta_f + b_{12}\delta_r \quad (1a)$$

$$\dot{\Omega} a_{21}(v_x)v_y + a_{22}(v_x)\Omega + b_{21}\delta_f + b_{22}\delta_r \quad (1b)$$

where $v_y$ is the lateral velocity of vehicle center of gravity, $v_x$ is the longitudinal velocity of vehicle, $\Omega$ is vehicle yaw rate, and $\delta_f$ and $\delta_r$ are the front and rear steering angles, respectively. The coefficients in equations (1) may be given by:

$$a_{11}(v_x) = -\frac{C_f + C_r}{Mv_x}, \quad a_{12}(v_x) = \frac{-C_f a + C_r b}{Mv_x}, \quad (2)$$

$$a_{21}(v_x) = -\frac{-C_f a + C_r b}{I_{zz} v_x} \quad a_{22}(v_x) = -\frac{C_f a^2 + C_r b^2}{I_{zz} v_x},$$

$$b_{11} = \frac{C_f}{M}, \quad b_{12} = \frac{C_r}{M}, \quad b_{21} = \frac{C_f a}{I_{zz}}, \quad b_{22} = \frac{C_r b}{I_{zz}}$$

where M is the vehicle total mass, $I_{zz}$ is the vehicle yaw moment of inertia, a and b are the distances from vehicle center of gravity to front and rear axles, respectively, and $C_f$ and $C_r$ are the cornering stiffness coefficients of both front and both rear tires, respectively. Lateral acceleration of vehicle center of gravity, $a_y$, may be determined from the following kinematic relationship:

$$a_y = \dot{v}_y + v_x \Omega \quad (3)$$

Assuming that vehicle longitudinal speed is a slowly varying function of time, taking the Laplace transforms on both sides of equations (1) and (3), and subsequently using notation (2), the transfer functions between the front and rear steering and vehicle yaw rate, lateral acceleration and lateral velocity may be obtained. This yields:

$$\Omega(s) = G_\Omega(0) \frac{1 + T_{\Omega f} s}{1 + \frac{2\zeta}{\omega_n} s + \frac{1}{\omega_n^2} s^2} \delta_f(s) - G_\Omega(0) \frac{1 + T_{\Omega r} s}{1 + \frac{2\zeta}{\omega_n} s + \frac{1}{\omega_n^2} s^2} \delta_r(s) \quad (4)$$

$$a_y(s) = \quad (5)$$

$$G_{ay}(0) \frac{1 + T_{a1f} s + T_{a2f} s^2}{1 + \frac{2\zeta}{\omega_n} s + \frac{1}{\omega_n^2} s^2} \delta_f(s) + G_{ay}(0) \frac{-1 + T_{a1r} s + T_{a2r} s^2}{1 + \frac{2\zeta}{\omega_n} s + \frac{1}{\omega_n^2} s^2} \delta_r(s)$$

$$v_y(s) = G_{vyf}(0) \frac{1 + T_{vyf} s}{1 + \frac{2\zeta}{\omega_n} s + \frac{1}{\omega_n^2} s^2} \delta_f(s) + G_{vyr}(0) \frac{1 + T_{vyr} s}{1 + \frac{2\zeta}{\omega_n} s + \frac{1}{\omega_n^2} s^2} \delta_r(s) \quad (6)$$

In the above equations $G_\Omega(0)$, $G_{ay}(0)$, $G_{vyf}(0)$ and $G_{vyr}(0)$ are the ratios of steady state yaw rate, lateral acceleration, and side slip velocity responses to the front and rear steering inputs. The ratios may be given by:

$$G_\Omega(0) = \frac{v_x}{l + K_u v_x^2}, \quad G_{ay}(0) = \frac{v_x^2}{l + K_u v_x^2}, \quad (7)$$

$$G_{vyf}(0) = \frac{b - \frac{Ma}{C_r l} v_x^2}{l + K_u v_x^2} v_x \quad G_{vyr}(0) = \frac{a + \frac{Mb}{C_f l} v_x^2}{l + K_u v_x^2} v_x$$

where $l = a + b$ is vehicle wheelbase and $K_u$ is the understeer coefficient given by:

$$K_u = \frac{C_r b - C_f a}{C_f C_r l} M \quad (8)$$

The parameters in the transfer functions may be given by:

$$\frac{2\zeta}{\omega_n} = \frac{(C_f a^2 + C_r b^2) M + (C_f + C_r) I_{zz}}{C_f C_r l} \frac{v_x}{l + K_u v_x^2} \quad (9)$$

$$\frac{1}{\omega_n^2} = \frac{M I_{zz}}{C_f C_r l} \frac{v_x^2}{(l + K_u v_x^2)}$$

$$T_{\Omega f} = \frac{Ma}{C_r l} v_x, \quad T_{\Omega r} = \frac{Mb}{C_f l} v_x$$

$$T_{a1f} = \frac{b}{v_x}, \quad T_{a2f} = \frac{I_{zz}}{C_r l}, \quad T_{a1r} = \frac{a}{v_x}, \quad T_{a2r} = \frac{I_{zz}}{C_f l}$$

$$T_{vyf} = \frac{\frac{I_{zz}}{C_r l} v_x}{b - \frac{Ma}{C_r l} v_x^2}, \quad T_{vyf} = \frac{\frac{I_{zz}}{C_f l} v_x}{a + \frac{Mb}{C_f l} v_x^2}$$

The following observations may be made by inspecting equations (3) through (9): all of the transfer functions have the same denominators, and hence the same pole locations; the pole locations may be changed by feedback control, but not by feed-forward control; and the natural frequency of the vehicle model, $\omega_n$, decreases with vehicle speed. Consequently, if the effects of zero locations are ignored for the moment, the time delays in yaw rate and lateral acceleration responses to steering input increases as the velocity increases. To maintain stability of the overall vehicle/driver system, a driver has to advance the phase lead in steering control to compensate for increasing delays in vehicle responses. Since this increases driver workload, it is desirable to minimize these delays.

Vehicle transient response is affected not only by the poles (determined by the denominators of transfer functions), but also by zeros, which are determined by the numerators of transfer functions. The effects of zeros on the transient responses in terms of yaw rate and lateral acceleration may be considered. The numerator terms involving s and $s^2$ (e.g., differentiators) with positive coefficients advance the phase in transient response. From equation (4), when the vehicle steering characteristic is close to neutral (e.g., the understeer coefficient, $K_u = 0$, hence $b/C_f = a/C_r$), then the lead time constants, $T_{\Omega f}$ and $T_{\Omega r}$, are equal. Thus, the transfer functions relating yaw rate to front and rear steering angles are approximately equal not only in poles, but also in zeros. If the rear wheels are steered in proportion to the front wheels (e.g., a static feed-forward gain), the transient response of yaw rate does not change significantly. If the vehicle has understeer characteristic, then $T_{\Omega r} > T_{\Omega f}$ and the delay in yaw response may be reduced slightly. On the other hand, the transfer functions of lateral acceleration responses to the front and rear steer angles have the same pole locations, but quite different zero locations. Consequently, the transient response characteristics of lateral acceleration may be changed significantly by steering the rear wheels in proportion to the front wheels.

For a front steer vehicle, the lead term, $T_{\Omega f}$, in the numerator of the transfer function relating yaw rate to the front steering angle increases with speed. Concurrently, the first lead term, $T_{a1f}$, in the transfer function for lateral acceleration decreases with speed, while the second, $T_{a2f}$, remains constant. Consequently, as speed increases, the lateral acceleration response delays more than the yaw rate response. At low speeds, lateral acceleration leads yaw rate, but at high speeds it lags yaw rate, with the lag increasing with speed. This effect may be explained by the fact that the lead gain, $T_{vyf}$, in the vehicle side slip velocity transfer function declines with a rise in vehicle speed, becoming negative at high speeds. Considering equation (3), lateral acceleration is a sum of lateral velocity derivative and the product of speed and yaw rate (which is in phase with yaw rate). As such, phase lead or lag of lateral acceleration relative to yaw rate may be determined by a side slip velocity derivative.

In emergency lane change maneuvers, both objective task performance measures and driver's subjective ratings of vehicle handling quality may improve when the phase lags in lateral acceleration and yaw rate responses are reduced. It is desirable to keep the lags in yaw rate and lateral acceleration approximately equal. Considering equation (3), this may be achieved by introducing the rear wheel steer, which eliminates, or at least reduces, lateral velocity $v_y$ (and its derivative). It may be determined from equation (6) that reducing the lateral velocity to zero in dynamic sense, the rear wheel steering angle must be related to the front wheel steer angle via a dynamic transfer function. A static feed-forward gain may only bring the steady-state values of lateral velocity to zero (the values corresponding to s=0).

In summary, it may be concluded that active rear steer with static feed-forward gain: 1) may bring the lags in lateral acceleration and yaw rate closer together (over the entire range of speeds), but it may not significantly reduce the lag in yaw rate response; and 2) may eliminate lateral velocity at steady-state, but not during transient maneuvers. The aforementioned limitations may be removed if a dynamic feed-forward control is used. In what follows, the static and dynamic feed-forward control is examined in greater detail.

Feed-Forward Control with Static Gain

Assuming for the time being that a feed-forward control system steers the rear wheels in proportion to the front wheels:

$$\delta_r = K_{ff} \delta_f \qquad (10)$$

where $K_{ff}$ is the feed-forward gain (ratio). Then, in order to bring the steady-state value of vehicle lateral velocity to zero over a full range of vehicle speed, the steering ratio may be:

$$K_{ff0} = -\frac{G_{vyf}(0)}{G_{vyr}(0)} = \frac{-b + \frac{Ma}{C_r l} v_x^2}{a + \frac{Mb}{C_f l} v_x^2} \qquad (11)$$

The gain, $K_{ff0}$, which follows directly from equation (6), is shown in FIG. 1. The gain is negative at low speeds (out of phase steering) and positive at high speeds (in phase steering). Steering the rear wheels in an opposite direction to front wheels increases vehicle yaw rate and reduces radius of curvature, thus improving maneuverability. Steering the rear wheels in the same direction as the front wheels reduces vehicle yaw rate, promoting stability. The gain of equation (11) calls for large steering angle at the rear wheels at low speeds, particularly when the front wheels are steered sharply. It also yields very low, subjectively objectionable, yaw rates (almost pure lateral translation without rotation) in quick transient maneuvers performed at high speeds. In practice, therefore, the gain is a fraction of that given by equation (11). For example:

$$K_{ff} = \eta K_{ff0} \qquad (12)$$

with a typical value of $\eta=0.4$. The gain, $K_{ff}$, is also shown in FIG. 1. The actual gain is somewhat modified through vehicle testing and tuning.

Substituting the control law of equation (10) into equations (4) and (5) may yield the following transfer functions between the front steer angle and vehicle yaw rate and lateral accelerations:

$$\Omega(s) = G_\Omega(0) \frac{(1 - K_{ff}) + (T_{\Omega f} - K_{ff} T_{\Omega r})s}{1 + \frac{2\zeta}{\omega_n} s + \frac{1}{\omega_n^2} s^2} \delta_f(s) \qquad (13)$$

$$a_y(s) = \qquad (14)$$
$$G_{ay}(0) \frac{(1 - K_{ff}) + (T_{a1f} + K_{ff} T_{a1r})s + (T_{a2f} + K_{ff} T_{a1r})s^2}{1 + \frac{2\zeta}{\omega_n} s + \frac{1}{\omega_n^2} s^2} \delta_f(s)$$

From equation (13), when vehicle steering characteristic is close to neutral and $T_{\Omega f} = T_{\Omega r}$, the yaw rate of the vehicle is directly proportional to the yaw rate of front steer vehicle, with the coefficient of proportionality equal to $(1-K_{ff})$. Hence, the lag in transient yaw response is not affected. When the vehicle has an understeer characteristic, then the delay in yaw rate response may be reduced, depending on particular values of $K_{ff}$. At the same time, at the speed range for which the feed-forward gain is positive, the lead terms in the transfer function (14) are increased, thus reducing the lag in acceleration response. The opposite is true for low speed, for which $K_{ff}<0$. As a result, the lags in yaw rate and lateral acceleration responses are brought closer to each other over the entire range of speeds.

Feed-Forward Control with Dynamic Gain

When the steer ratio, $K_{ff}$, is set to the value given by equation (11), the steady-state value of vehicle lateral velocity and side slip angle is zero over a full range of vehicle speed. In a transient state, however, the body side slip angle may not necessarily be zero. In order to make the lateral velocity (and the side slip angle) equal to zero in transient maneuvers and in steady-state, the rear wheel steering angle must be dynamically controlled; it follows from equation (6) that the rear steering angle should be:

$$\delta_r(s) = -\frac{G_{vyf}(0)}{G_{vyr}(0)} \frac{1 + T_{vyf} s}{1 + T_{vyr} s} \delta_f(s) \qquad (15)$$

Upon substitution of symbols, equation (15) may be expressed in terms of vehicle parameters as:

$$\delta_r(s) = \frac{-b + \frac{Ma}{C_r l}v_x^2 - \frac{I_{zz}}{C_r l}v_x s}{a + \frac{Mb}{C_f l}v_x^2 + \frac{I_{zz}}{C_f l}v_x s}\delta_f(s) \qquad (16)$$

Equation (16) may be written as:

$$\delta_r(s) = \left(K_{f\!f0} - \frac{K_{10}s}{Ts+1}\right)\delta_f(s) \qquad (17)$$

where the lead gain $K_{10}$ and the time constant T may be given by:

$$K_{10} = \frac{I_{zz}v_x}{C_f C_r l} \frac{C_f a - C_r b + m v_x^2}{\left(a + \frac{mb}{C_f l}v_x^2\right)^2} \qquad (18)$$

$$T = \frac{\frac{I_{zz}}{C_f l}v_x}{\left(a + \frac{mb}{C_f l}v_x^2\right)} \qquad (19)$$

The parameters, $K_{10}$ and T, as functions of velocity are shown in FIG. 2. Except for very low velocities, the gain, $K_{10}$, is positive. Equation (17) indicates that the rear steering angle consists of: the steady state term, $K_{f\!f0}\delta_f$, (corresponding to s→0), which is identical as before; and a dynamic term, $[K_{-10}s/(Ts+1)]\delta_f$ present only during transients. At velocities above 5 m/s, for example, the dynamic term has a sign opposite the derivative of the front steering angle, that is, it introduces a phase lag in rear steering angle. As a result, the rear steering angle exhibits the following behavior: when the steering wheel is turned quickly, the rear wheels are initially steered in the opposite direction than the front wheels; and in a steady-state, or when the steering wheel is turned slowly, the rear wheels are steered in the same direction as the front wheels.

The initial out of phase steering of the rear wheels make the vehicle steer more sharply (e.g., better turn in), while steering the rear wheels in phase with the front wheels promotes greater stability. For the reasons previously discussed, the static feed-forward gain, $K_{f\!f0}$, may be scaled down by the factor η of approximately 0.4. Therefore, the lead gain, $K_{10}$, may also be reduced by a factor $η_1$, which, for example, is chosen to equal to 0.6. Thus, the control law becomes:

$$\delta_r(s) = \left(K_{f\!f} - \frac{K_1 s}{Ts+1}\right)\delta_f(s) \qquad (20a)$$

with:

$$K_{f\!f} = \eta K_{f\!f0}, \quad K_1 = \eta_1 K_{10} \qquad (20b)$$

The control law of equation (20) with the dynamic feed-forward gain may result in a yaw rate response:

$$\Omega(s) = G_\Omega(0)\frac{(1 - K_{f\!f}) + (T_{\Omega f} - K_{f\!f}T_{\Omega r})s + \frac{(1+T_{\Omega s}s)K_1 s}{1+Ts}}{1 + \frac{2\zeta}{\omega_n}s + \frac{1}{\omega_n^2}s^2}\delta_f(s) \qquad (21)$$

Comparing the above transfer function with equation (13) obtained with static feed-forward gain, an additional term has been introduced. This provides a phase lead to the yaw response. If the control law of equation (17) with the gains given by equations (18) and (19) were used, the side slip would have become zero. In addition, the acceleration response would be in phase with yaw response. In practice, since the control gains are reduced, acceleration response still lags yaw rate response at high speeds.

To illustrate the effects of this control law, the steering inputs and vehicle responses are compared in the case of a single lane change maneuver performed at, for example, 30 m/s. The driver steering input may be a sine wave of frequency 0.5 Hz. Two cases are compared. In the first case, according to equation (10), the rear wheels are steered proportionally to the front. In the second case, the control law with the dynamic control gain provided by equation (20) is used. In the second case, the rear steering angle has initially an opposite sign to the front, and exhibits a phase lag throughout the maneuver. However, the lags in acceleration response, and especially in yaw rate, are reduced as compared to the case of purely static feed-forward gain. The desired values of yaw rate and lateral acceleration shown in FIG. 3 are the steady state values, which are in phase with the steering angle. They may be given by:

$$\Omega_{dss} = \frac{v_x(\delta_f - \delta_{rss})}{l + K_u v_x^2}, \quad a_{ydss} = \Omega_{dss}v_x \qquad (22)$$

The rear steering angle, $\delta_{rss}$, of equation (22) is the steady-state feed-forward portion of the rear wheel steering angle, calculated from equation (10). The maneuver shown in FIG. 3 is performed in the linear range of handling behavior, with maximum lateral acceleration of about 6 m/s². Since the vehicle response in this range is close to that predicted by the linear model considered here, the vehicle response with the proposed control law is improved. In addition to reductions in phase lags, the vehicle with dynamic feed-forward control achieves slightly higher lateral acceleration and turns more sharply. In general, the requirements of quick transient response and stability conflict, yet good handling behavior, involve balancing both factors. Since vehicles generally become less stable during transient maneuvers performed at the limit of adhesion, increasing the time delay in the rear wheel steering angle may further undermine stability. The results for a limit lane change maneuver with the steer angle four times that used in FIG. 3, are shown in FIG. 4. The vehicle with dynamic feed-forward gain is less stable in the second phase of maneuver as evidenced by a larger lag in yaw rate, lateral acceleration response, and, especially, by a much larger side slip angle. It is likely that with a driver in the loop, the difference in the two responses would be reduced (i.e., since the driver would input a smaller steering angle for a vehicle with a sharper response).

To avoid this problem, the dynamic gain, $K_1$, in equation (20) may be multiplied by a factor f, which depends on severity of maneuver. This may yield the control law:

$$\delta_r(s) = \left(K_{f\!f} - f\frac{K_1 s}{Ts+1}\right)\delta_f(s) \qquad (23)$$

If the vehicle is in the linear range of handling behavior, the factor, f, equals one; when vehicle is at the limit of adhesion, the factor drops to zero. A determination whether the vehicle is or is not in the linear range of operation may be made from the magnitude of desired lateral acceleration and the yaw rate error (e.g., the difference between the desired and measured yaw rates). More specifically, the factor may be calculated as follows: First, a factor, $f_1$, may be computed as a function of the slew-limited magnitude of desired lateral acceleration. If the slew limited magnitude of desired lateral acceleration is less than an assigned value (e.g., 8 m/s²), the factor, $f_1$, may equal one. When the slew limited magnitude of desired lateral acceleration is greater than a second value (e.g., 12 m/s²), the factor, $f_1$, may equal zero. A linear interpolation of the factor, $f_1$, value may be provided between one and zero. The second factor, $f_2$, may be similarly determined as a function of slew-limited magnitude of yaw rate error. The factor, f, may then be selected as the lesser of the factors ($f_1$ and $f_2$). The rationale for this is: In maneuvers performed on dry surface, the desired lateral acceleration may be a good predictor of severity of maneuver. On slippery surfaces, however, the vehicle may reach the limit of adhesion even at relatively low desired lateral acceleration. Under such circumstances, the yaw rate error may be a better measure of severity of maneuver. If yaw rate signal is not available, only the factor fi is used (e.g., f is equal to $f_1$).

The results obtained for the same maneuver of FIG. 4 are shown in FIG. 5. The results for a vehicle with static feed-forward gain are the same as before, but the dynamic feed-forward gain is multiplied by the factor calculated as previously described. The factor, f, drops to zero at the beginning of the first turn. Thus, the rear wheels are only initially steered out of phase, which improves initial "turn in" (e.g., quicker yaw rate and lateral acceleration response). After that initial period, the rear wheel steering angle is the same as in the case of static feed-forward gain. As a result, subsequent vehicle responses are nearly identical. The overall result may be a favorable trade off between responsiveness and stability (e.g., an improvement in initial response without penalty in stability, even when the driver oversteers).

Comparison with Feedback Control

In this section the improvements in vehicle transient response achieved by the dynamic feed-forward control are compared with those achievable with the feedback control law. The feedback control law uses primarily feedback of vehicle yaw rate, which is a difference between the desired and measured yaw rate. As previously described, if the desired yaw rate represents true vehicle dynamic response to given steering input in the linear range of operation, including the dynamic delay, then the error signal is close to zero when vehicle is in the linear range of handling. Thus, no improvement in vehicle response in this range may be obtained through feedback control. In order to achieve a reduction in phase lag between the steering angle and vehicle yaw rate, the desired yaw rate used by the algorithm should lead the actual yaw response. An appropriate choice may be the desired yaw rate at steady state, given by equation (22), which is in phase with the steering angle. Consider the following feedback control law:

$$\Delta \delta_r = -K_p(\Omega_{dss} - \Omega) - K_d(\dot{\Omega}_{dss} - \dot{\Omega}) \quad (24)$$

where $\Delta \delta_r$ is the feedback rear steering correction, $K_p$ is the proportional feedback gain, $K_d$ is the differential gain, and $\Omega_{dss}$ is the desired yaw rate calculated from equation (22) with the rear steer angle obtained from the static feed-forward control law of equation (10). Since the desired yaw rate leads the actual yaw rate, and the feedback control system attempts to bring the two closer together, the result is a reduction in the phase lag of vehicle yaw response to the steering inputs.

To illustrate the effect of this control, the result of combined closed loop and open loop control (with a static feed-forward gain) as compared to the open loop control (again, with a static gain), are shown in FIG. 6. The vehicle performs the same lane change maneuver as in FIG. 3. The rear steering pattern is very similar to that exhibited by dynamic feed-forward control, shown in FIG. 3. Consequently, vehicle response also benefits from reduced lags in both yaw and acceleration responses. Comparing FIGS. 3 and 6, the feedback control and dynamic feed-forward control yield similar vehicle responses. The dynamic feed-forward control, however, gives slightly quicker initial response resulting in marginally tighter path. On the other hand, the feedback control is more effective in reducing lag in the second part of maneuver. It should be emphasized that, as opposed to feedback control, the benefits of dynamic feed-forward control may be achieved without the need for additional sensors.

The Present Invention

A system for implementing the method and computer usable medium according to the present invention may include a variety of commercially available components. As recognized in the art, commercially available sensors may provide vehicle velocity, yaw rate (optional), and steering angle (front and rear) information. Hydraulic or electrical drives, such as those used in commercial four-wheel steered vehicle, may actuate steering of front and rear wheels. The methods and determinations (e.g., calculations), including those based on equations or value tables, may be performed by a device such as a microprocessor. The microprocessor may receive input, perform calculations, and provide output for controlling the drive(s) and, consequently, rear-wheel steering. Furthermore, the computer usable medium and value tables may be programmed in a microprocessor memory portion (e.g., ROM, RAM, and the like) for executing functions associated with the present invention.

FIG. 7 is a flow chart of a dynamic feed-forward control algorithm made in accordance with the present invention. The algorithm may begin wherein a plurality of vehicle inputs are provided (step 100). In one embodiment, the inputs received by the algorithm may be: estimated vehicle speed, $v_x$; measured steering angle of the front wheels, $\delta_f$, (which is derived from the measured steering wheel angle); and measured rear wheel angle, $\delta_r$. If the closed loop control algorithm is used (in addition to the feed-forward control algorithm), other information, such as measured and desired yaw rate, $\Omega$ and $\Omega_d$, may be available.

Feed-forward control gains may be determined as functions of vehicle speed (step 101). In one embodiment, a static feed-forward gain, $K_{ff}(v_x)$, may be calculated from equations (11) and (12). The parameters in dynamic gain $K_1(v_x)$ and $T(v_x)$ may be computed from equations (18), (19) and (20b). In another embodiment, the static feed-forward gain, $K_{ff}(v_x)$, and the parameters in dynamic gain $K_1(v_x)$ and $T(v_x)$ may be determined through a "look-up" process of a value table (e.g., value database). Those skilled in the art will recognize that the variables associated with the present invention may be determined by a variety of methods, including equations and value tables.

A steady-state value (static portion) of the feed-forward rear wheel steer, $\delta_{rss}$, may be determined (step 102). In one embodiment, this may be computed by multiplying the static feed-forward gain, $K_{ff}(v_x)$, by the front steering angle, $\delta_f$, according to equation (10).

A slew limited magnitude of desired lateral acceleration may be determined by first taking the absolute value of the desired lateral acceleration and then applying an asymmetric slew filter (step 104). The filter permits the filtered value to rise quickly, but limits the rate of decay. As a result, a filtered and limited magnitude of lateral acceleration may be calculated, $a_{ydeslim}$, providing a good measure of maneuver severity, especially on a dry surface.

A decision may be made on whether yaw rate signal information is available. The information may be available when feedback control loop is used in addition to the feed-forward loop. If the yaw rate signal information is not available, then a multiplying factor, f, may be determined using $a_{ydeslim}$ alone (step 105). In one embodiment, if $a_{ydeslim}$ is less than an assigned value (e.g., 8 m/s²), the factor may equal one, when it is greater than another value (e.g., 12 m/s²), it may equal zero, with a linear interpolation between those values.

If the yaw rate signal information (e.g., $\Omega$ and $\Omega_d$) is available, a multiplying factor, f, may be determined (step 106). In one embodiment, a factor, $f_1$, may be computed as the multiplying factor, f, above. The magnitude of yaw rate error (e.g., the difference between the desired and measured yaw rate) may be calculated by taking the absolute value and then applying an asymmetric slew filter (e.g., comparable to the desired lateral acceleration calculation). A factor, $f_2$, may be subsequently determined as a function of slew-limited magnitude of yaw rate error. The factor, $f_2$, may equal one when the slew-filtered magnitude of yaw rate error is less than a specified value (e.g., 6 deg/s) and may equal zero when equal or greater then a second value (e.g., 12 deg/s), with a linear interpolation between. The multiplying factor, f, may be subsequently selected as the lesser of the two factor values, $f_1$ and $f_2$.

A feed-forward rearsteering angle, $\delta_{rff}$, may be determined (step 107). In one embodiment, this may be computed by using a time domain equivalent of equation (23). Specifically, the rear steering angle $\delta_{rff}$ may be divided into a static portion, $\delta_{rss}$, and a dynamic portion, $\delta_{rdyn}$:

$$\delta_{rff} = \delta_{rss} + f\delta_{rdyn} \quad (25)$$

where the static portion is given by equation (10), that is:

$$\delta_{rss}(i) = K_{ff}\delta_f(i) \quad (26)$$

where index, i, refers to the discrete time variable. The dynamic feed-forward portion of the rear steering angle is in a Laplace domain given by:

$$\delta_{rdyn}(s) = -\frac{K_1 s}{Ts+1}\delta_f(s) \quad (27)$$

The discrete time domain of equation (27) corresponds to:

$$\delta_{rdyn}(i) = (1+\Delta t/T)\delta_{rdyn}(i-1) - (K_1/T)[\delta_f(i) - \delta_f(i-1)] \quad (28)$$

where symbol, $\Delta t$, denotes sampling time.

In one embodiment, the feed-forward rear steering angle, $\delta_{rff}$, may be determined based on at least one value table. For example, the rear wheel static feed-forward gain, $K_{ff}$, the lead gain, $K_1$, and the time constant, T, portions of the feed-forward rear steering angle may be determined from the value table(s).

Determining the feed-forward rear steering angle according to the present invention may provide an enhanced transient response by dynamic feed-forward control. In addition, the determination may be achieved without the need for additional sensors (e.g., yaw rate sensors). The determined feed-forward rear steering angle may then be communicated to the hydraulic or electrical drives to actuate steering of the rear wheels. In one embodiment, the feed-forward steering angle information may be electronically transmitted from the microprocessor to the drives providing rear-wheel steering control.

Conclusions

The present invention may improve transient handling response of vehicles with four-wheel steering beyond that achievable by currently employed algorithms in the linear range of handling behavior. It may be concluded:

1) The lag in vehicle yaw response may not be significantly reduced in the linear range of operation by either static feed-forward control or feedback control (in which the desired yaw rate is based on vehicle dynamic response).
2) A dynamic feed-forward control law, which reduces both transient and steady state lateral velocity, may reduce the phase lag in vehicle yaw rate and acceleration responses by briefly steering the rear wheels in the opposite direction to the front.
3) The dynamic feed-forward control may slightly reduce vehicle stability in maneuvers performed at the limit of adhesion as compared to the static feed-forward gain. An algorithm was therefore proposed that recognizes limit maneuvers and disables the dynamic part of the feed-forward gain when the limit maneuver is detected.
4) The yaw rate feedback control law, in which the desired yaw rate is a static function of steering angle (without dynamic delay), may reduce lag in yaw rate and lateral acceleration responses. This feedback approach may produce almost the same rear steering pattern and vehicle response as the dynamic feed-forward control, but requires additional sensors.

While the embodiments of the invention disclosed herein are presently considered to be preferred, various changes and modifications may be made without departing from the spirit and scope of the invention. For example, the described algorithm and calculations are not limited to any particular method sequence or equation. Specifically, values may be determined by a variety of methods, such as by equation or value table. Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A method for steering a vehicle having driver-controlled front wheel steering and active rear wheel steering, comprising:
   determining a rear wheel steering angle static portion based on a control gain and a front wheel steering angle;
   determining a slew-limited magnitude of desired lateral acceleration based on a desired lateral acceleration;
   determining a multiplying factor based on the slew-limited magnitude of desired lateral acceleration; and
   determining a feed-forward rear steering angle based on the multiplying factor, the rear wheel steering angle static portion, and a rear wheel steering angle dynamic portion.

2. The method of claim 1 wherein the active rear wheel steering is controlled electronically.

3. The method of claim 1 wherein the multiplying factor equals one when the slew-limited magnitude of desired lateral acceleration is less than an assigned value of about 8 m/s².

4. The method of claim 1 wherein the multiplying factor equals zero when the slew-limited magnitude of desired lateral acceleration is greater than an assigned value of about 12 m/s².

5. The method of claim 1 wherein the multiplying factor is determined based on a magnitude of yaw rate error.

6. The method of claim 1 wherein the multiplying factor is determined based on a linear interpolation.

7. The method of claim 1 wherein the feed-forward rear steering angle is determined in accordance with a Laplace domain expression:

$$\delta_r(s) = \left(K_{ff} - f \frac{K_1 s}{Ts+1}\right)\delta_f(s)$$

where $\delta_r$ is the feed-forward steering angle, $K_{ff}$ is a rear wheel static feed-forward gain, f is the multiplying factor, $K_1$ is a lead gain, T is a time constant, and $\delta_f$ is the front wheel steering angle.

8. The method of claim 7 wherein at least one of the rear wheel static feed-forward gain, $K_{ff}$, the lead gain, $K_1$, and the time constant, T, are functions of vehicle speed.

9. The method of claim 1 wherein the feed-forward rear steering angle is determined based on at least one value table.

10. A computer usable medium including a program for steering a vehicle having driver-controlled front wheel steering and active rear wheel steering, comprising:
computer readable program code for determining a rear wheel steering angle static portion based on a control gain and a front wheel steering angle;
computer readable program code for determining a slew-limited magnitude of desired lateral acceleration based on a desired lateral acceleration;
computer readable program code for determining a multiplying factor based on the slew-limited magnitude of desired lateral acceleration; and
computer readable program code for determining a feed-forward rear steering angle based on the multiplying factor, the rear wheel steering angle static portion, and a rear wheel steering angle dynamic portion.

11. The computer usable medium of claim 10 wherein the active rear wheel steering is controlled electronically.

12. The computer usable medium of claim 10 wherein the multiplying factor equals one when the slew-limited magnitude of desired lateral acceleration is less than an assigned value of about 8 m/s².

13. The computer usable medium of claim 10 wherein the multiplying factor equals zero when the slew-limited magnitude of desired lateral acceleration is greater than an assigned value of about 12 m/s².

14. The computer usable medium of claim 10 wherein the multiplying factor is determined based on a magnitude of yaw rate error.

15. The computer usable medium of claim 10 wherein the multiplying factor is determined based on a linear interpolation.

16. The computer usable medium of claim 10 wherein the feed-forward rear steering angle is determined in accordance with a Laplace domain expression:

$$\delta_r(s) = \left(K_{ff} - f \frac{K_1 s}{Ts+1}\right)\delta_f(s)$$

where $\delta_r$ is the feed-forward steering angle, $K_{ff}$ is a rear wheel static feed-forward gain, f is the multiplying factor, $K_1$ is a lead gain, T is a time constant, and $\delta_f$ is the front wheel steering angle.

17. The computer usable medium of claim 16 wherein at least one of the rear wheel static feed-forward gain, $K_{ff}$, the lead gain, $K_1$, and the time constant, T, are functions of vehicle speed.

18. The computer usable medium of claim 1 wherein the feed-forward rear steering angle is determined based on at least one value table.

* * * * *